United States Patent [19]

Carr

[11] Patent Number: 4,750,377

[45] Date of Patent: Jun. 14, 1988

[54] ASSEMBLY FOR ROTATING A DRUM

[75] Inventor: John Carr, Walnutport, Pa.

[73] Assignee: Fuller Company, Bethlehem, Pa.

[21] Appl. No.: 897,229

[22] Filed: Aug. 18, 1986

[51] Int. Cl.[4] .......................... F16H 55/12; F27B 7/00

[52] U.S. Cl. .......................................... 74/433; 74/447

[58] Field of Search ................. 74/431, 432, 433, 446, 74/447, 448; 34/108; 432/103, 251

[56] References Cited

U.S. PATENT DOCUMENTS

| | | | |
|---|---|---|---|
| 2,399,122 | 4/1946 | Johnson | 74/446 |
| 3,247,601 | 4/1966 | Sims | 34/108 |
| 3,496,993 | 2/1970 | Azelborn | 74/446 |
| 3,561,741 | 2/1971 | Richardson | 74/447 |
| 4,447,966 | 5/1984 | Mollenkopf et al. | 34/108 |
| 4,552,508 | 11/1985 | Reid | 74/448 |
| 4,595,177 | 6/1986 | Done | 432/251 |

FOREIGN PATENT DOCUMENTS

| | | | |
|---|---|---|---|
| 1957330 | 5/1971 | Fed. Rep. of Germany | 432/103 |
| 141095 | 2/1961 | U.S.S.R. | 74/447 |

*Primary Examiner*—Lawrence Staab

*Attorney, Agent, or Firm*—Frank H. Thomson

[57] ABSTRACT

A rotary assembly for rotating a vessel such as a rotary kiln with a minimum amount of heat transfer to the driving element. A pluraltiy of coupling assemblies are provided which include a first bracket attached to the vessel. Pivotally connected to the bracket is a link member having an opposite pivot point on the driving element. With the coupling arrangement, heat from the inner rotating element which causes different rates of thermal expansion with respect to the girth gear does not produce high stresses on either element.

2 Claims, 3 Drawing Sheets

ASSEMBLY FOR ROTATING A DRUM

BACKGROUND OF THE INVENTION

This invention relates to an apparatus for rotating a drum and more particularly the invention relates to an apparatus for connecting a drive gear to the shell of a rotating drum. Specifically, the apparatus of the present invention is designed for rotating a large, heated rotary drum, such as a rotary kiln or dryer for thermal processing particulate material such as cement raw meal, limestone or the like.

Prior to the present invention, it was generally known that large rotary drums or cylindrical vessels such as rotary kilns, dryers, ball mills and the like would be rotatably mounted on suitable support mechanisms such as journals for ball mills and tires and roller support mechanisms in the case of large rotary kilns and dryers. Such drums are rotated by means of large girth gears which are concentrically mounted around the circumference of the drum and driven by a driving gear, such as a pinion which is connected through suitable reducers to a drive motor.

Suitable means must be provided for securing the girth gear to the cylindrical vessel so that the rotary motion of the gear is transmitted to the vessel to enable the vessel to be rotated. Because these rotary kilns and vessels are utilized for thermal processing material at temperatures up to 2000° F. and more, even though the vessels may be lined with refractory material, the rotary vessel itself is exposed to high temperatures and may have skin temperatures on the order of 300° to 500° F. Since these vessels may be ten to eighteen feet in diameter and have a length of 200 feet and more, the high temperature can result in substantial thermal expansion of the rotary drum. In addition, the vessels may be slightly out of round during the loaded condition. As a result of the thermal expansion of the rotary drum or the slightly out of roundness of the vessel, it is necessary that the means for securing the girth gear to the rotary vessel allow for some misalignment of the vessel and allow for thermal expansion and contraction of the vessel relative to the girth gear.

Prior to the present invention various techniques have been utilized for securing the girth gear to the vessel. Included among these techniques are the use of tangential springs which are welded to the drum and attached to the girth gear through pivotal fasteners. This type of arrangement can be difficult to set up for initial installation of the gear.

Another technique used to connect the vessel to the girth gear includes the use of a flange mounted on the end of the vessel. With the flange welded to the vessel, a gear or other driving member is secured to the flange. This flange will have a shape such that heat from the vessel is transferred to the flange, but the expansion of the flange will be unable to move the gear resulting in stresses being applied to the vessel. These thermal stresses will create a loosening of refractory material which may line the inside of the vessel requiring a shutdown of the apparatus for replacement of refractory.

SUMMARY

It is therefore the principal object of this invention to provide a novel coupling assembly for mounting a driving element such as a girth gear to a rotary vessel such as a rotary kiln.

It is a further object of this invention to provide a coupling assembly for attaching a girth gear to a rotary vessel which will not result in stress being applied to the drum as a result of expansion and contraction of the rotary vessel or some relative misalignment of the vessel and gear.

The foregoing and other objects will be carried out by providing an assembly for rotating a heated element with a minimum of heat transfer to a driving element comprising a girth gear having an outer periphery containing teeth for meshing with a driven toothed member; an internal shell element, said shell element being concentric to said girth gear; and a plurality of coupling members connecting the interior periphery of said girth gear to the outer periphery of said shell element, each of said coupling members including: a first bracket attached to the outer periphery of said interior shell element, a link member pivotally connected at one end to said first bracket and pivotally connected at its other end to said gear at a position circumferentially spaced from said first bracket, said link member permitting expansion and contraction of said shell element relative to said girth gear while maintaining coupling between said shell element and said girth gear.

The rotary assembly includes a girth gear having an outer periphery containing teeth for meshing with a driven tooth member such as a pinion in a manner known in the art. The gear is connected to an interior shell element such a rotary vessel, kiln or dryer. The shell and girth gear lie on a substantially concentric rotational axis. A plurality of coupling members connect the inner periphery of the girth gear to the outer periphery of the shell element. The coupling members include a bracket attached to the outer surface of the vessel to be rotated. A plurality of links are provided each connecting one of the brackets to the girth gear. The link is pivoted at one end to the bracket and thus to the vessel and and at its other end to the girth gear. The various coupling members are circumferentially spaced around the periphery of the shell. When the shell expands or contracts in the radial direction relative to the gear due to temperature differential and different rates of thermal expansion, the pivotal connection allows the shell to move radially relative to the gear avoiding stresses on the vessel.

In a preferred form of the invention, the ends of the link members are pivoted at the bracket and at the girth gear such that the link member is tangential to a circle having its center at the rotational center of the assembly. With the link members substantially tangential, the link member is driven in tension.

BRIEF DESCRIPTION OF THE DRAWINGS

The invention will be described in connection with the annexed drawings wherein.

DESCRIPTION OF THE PREFERRED EMBODIMENTS

Figure 1:
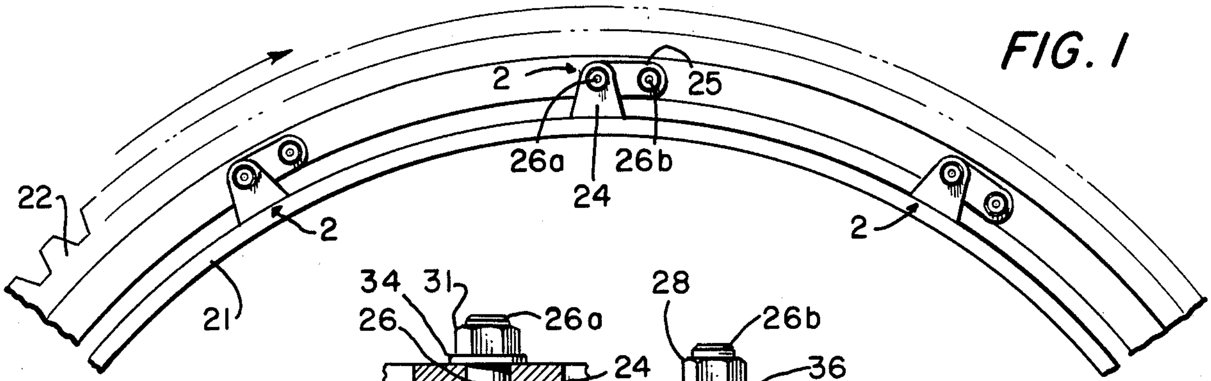
FIG. 1 illustrates a coupling assembly in accordance with one embodiment of the invention for connecting a girth gear to a rotary vessel.

Referring to FIG. 1, there is shown a girth gear 22 having teeth around its outer periphery for engaging a driving element such as a pinion, the pinion is operatively connected to a motor means (not shown) through a suitable reducer (not shown), in a manner known in the art. The girth gear may be manufactured in two halves which are assembled at the site of the installation. The rotating vessel or shell 21 is located on the inner circumference of the gear 22. In the assembly of the apparatus as shown in FIG. 1, the girth gear is placed around the outer periphery of the vessel 21 with a space between the drum 21 and the inside of the girth gear which space may be typically on the order of between two and four inches. In order to provide an operating assembly, the girth gear must be drivingly connected to the rotary vessel. With the present invention this is accomplished by a plurality of spaced apart coupling assemblies each generally indicated at 2.

Figure 3:
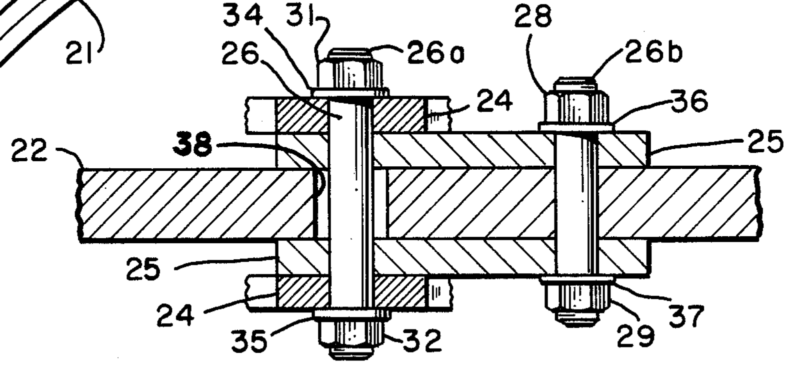
FIG. 3 is a sectional view taken on the line 3—3 of FIG. 2.
Figure 2:
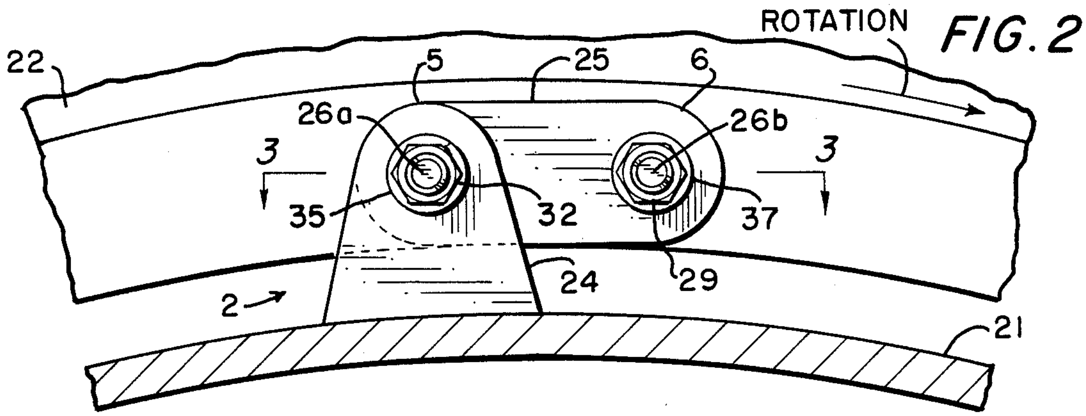
FIG. 2 shows a detail of a first embodiment of the invention for coupling rotating members.

In the embodiment of FIGS. 2 and 3, the coupling assembly 2 includes a pair of cooperating, axially spaced apart brackets 24, each adapted to be mounted on the shell by means of welding. A pair of axially spaced link members 25 are pivotally connected to the brackets 24 on opposite sides of the gear 22 by means of a pivot pin 26 connected at one end 5 of the link 25 which extends through the brackets 24 and the link members 25. The brackets 24 are spaced apart a distance sufficiently large to permit the inner periphery of the girth gear and the two links 25 to fit therebetween as clearly shown in FIGS. 2 and 3. It should be noted that the pin 26*a* extends through an oversize opening or clearance hole 38 in the gear 22 so that the one end 5 of link member 25 and the bracket 24 and pin 26*a* may move relative to the gear 22. The pins 26*a* may include threaded ends with nuts 31 and 32 and washers 34 and 35 for securing the pins 26*a* to the brackets 24.

The link members 25 are pivotally connected at their other end 6 to the gear 22 by means of pivot pins 26*b*. The pivot pins 26*b* are secured to the links 25 and gear 22 by means of nuts 28 and 29 and washers 36 and 37.

In order to install the girth gear 22 on the vessel 21, the gear is preferably furnished in two halves. These two halves are positioned around the outer periphery of the drum 21 in the desired longitudinal location on the gear and assembled into a single unit. The girth gear with links and brackets preassembled is trued with respect to the drum by the use of jack screws which extend between the girth gear and the outer periphery of the vessel 21 in a manner known in the art. Once the concentricity is established, the brackets 24 may be secured by welding to the outer surface of vessel 21.

With the apparatus illustrated in FIGS. 2 and 3, any expansion of the shell such as due to high temperatures will result in radial outward movement of the bracket 24 and pins 26*a*. Because the clearance opening 38 is larger in diameter than the pin 26, radial movement of the bracket 24 and pin 26 relative the girth gear will be permitted avoiding undue stress on both the gear and the shell. Instead, the link members 25 will pivot about the pin 26*b* so that the link member 25 pivots relative to the gear 22.

In the embodiment shown in FIGS. 2 and 3, each link member 25 is arranged so that it is substantially tangential with respect to a circle having its center coincident with the center of rotation of the gear 22 and shell 21. With this tangential relationship, the link member 25 is in a position to drive the assembly in the direction of the arrow in FIG. 1 so that each link is in tension.

In the embodiments shown in the remaining figures, the link member has the aforesaid tangential relationship with respect to the center of rotation.

Figure 5:
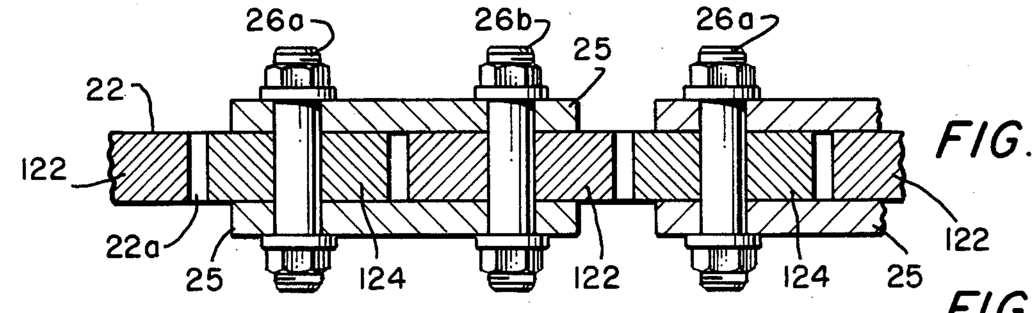
FIG. 5 is a sectional view taken on the line 5—5 of FIG. 4.
Figure 4:
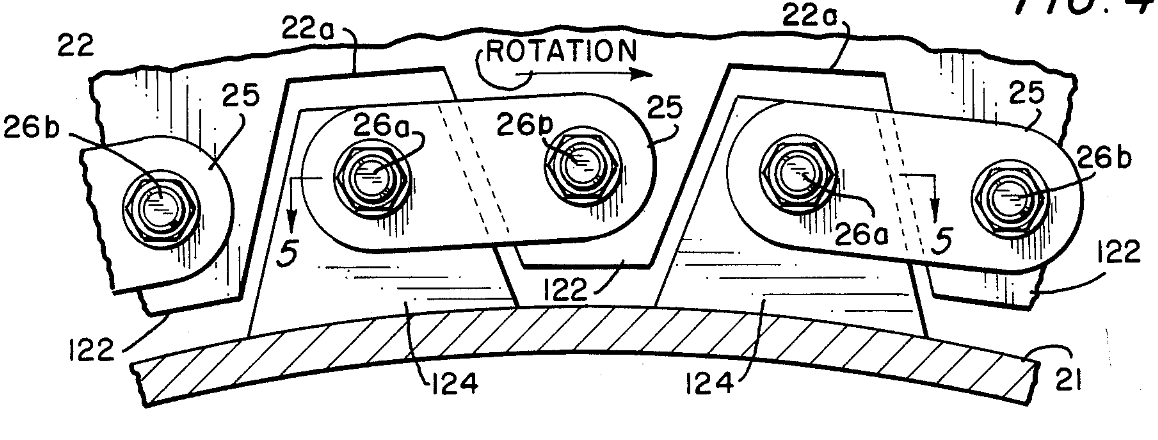
FIG. 4 is another embodiment of the invention.

In the embodiment shown in FIGS. 4 and 5, notches 22*a* are positioned in the web of the gear 22 to define teeth-like members 122. In this embodiment, the coupling assembly includes a plurality of spaced apart brackets 124. The brackets 124 fit within spaces 22*a* and teeth 122 fit between adjacent brackets so that the brackets 124 are in a plane within the girth gear 22, the links 25 are mounted on opposite sides of the brackets 124 and teeth 122. In this embodiment, it is not necessary to provide the enlarged clearance opening 38 as the shell 22 and brackets 124 can expand into the notches 22*a*. When such expansion occurs, the links 25 pivot at pins 26*a* and at pins 26*b*.

Figure 7:
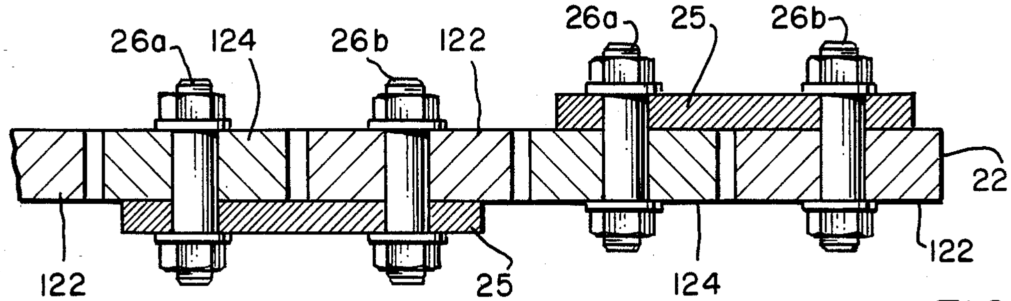
FIG. 7 is a sectional view taken on the line 7—7 of FIG. 6.
Figure 6:
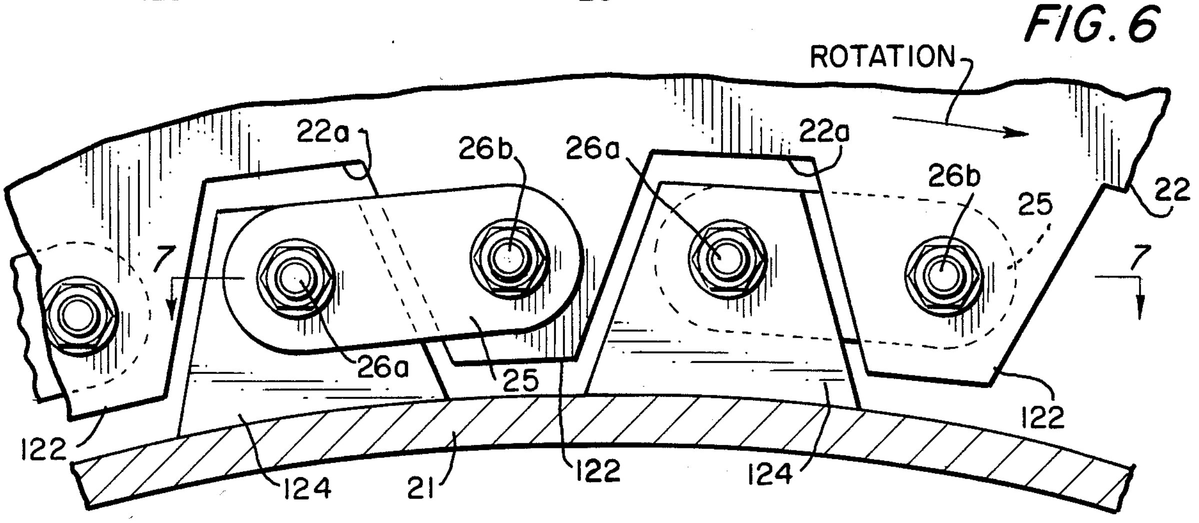
FIG. 6 is a still further embodiment of the coupling arrangement according to the present invention.

In FIGS. 6 and 7, the notch and teeth relationship shown in FIGS. 3 and 4 is utilized, but in this embodiment, the links 25 are staggered on opposite sides of the gear 22 so that rather than utilizing a pair of axially spaced-apart links 25 for each coupling assembly as in FIGS. 3 and 4, the assembly of this embodiment utilizes links 25 which are staggered; see FIG. 7.

Figure 9:
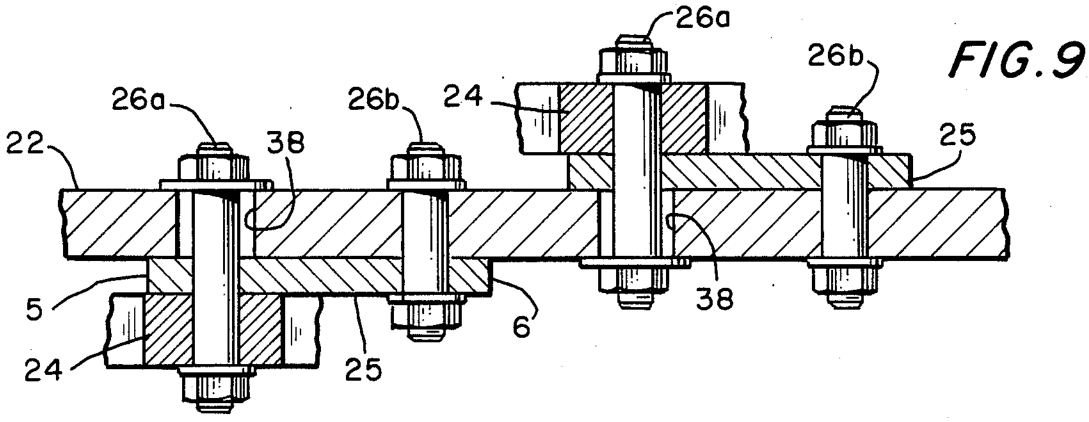
FIG. 9 is a sectional view taken on the line 9—9 of FIG. 8.
Figure 8:
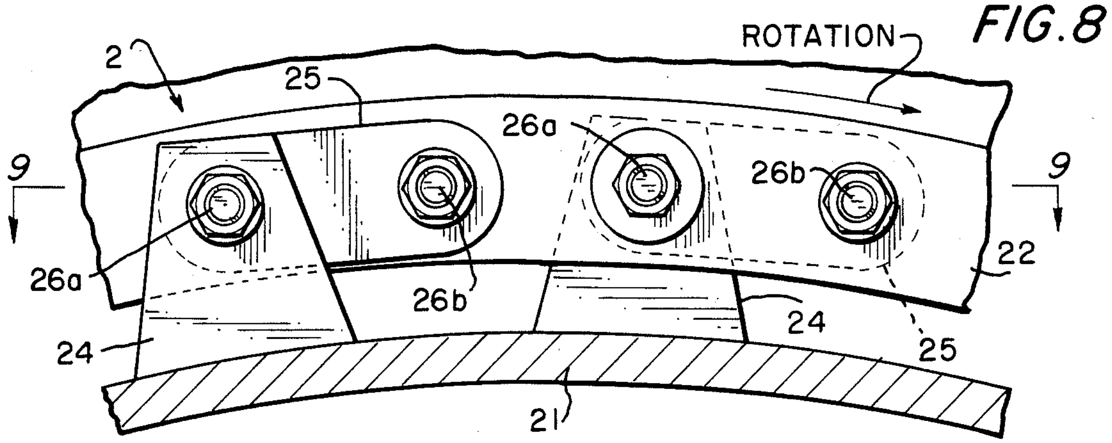
FIG. 8 is a further embodiment of the invention.

In the embodiment shown in FIGS. 8 and 9, the coupling assembly 2 includes brackets 24 are staggered on opposite sides of gear 22. Each bracket 24 only carries a single link member 25. In this embodiment, a clearance opening 38 in the gear 22 at the end 5 of each link is required to allow thermal expansion of the shell relative to the gear. Thus, as in FIGS. 2 and 3, as the shell 21 and bracket 24 move radially outward or inward, the pin 26*a* can also move radially outward relative to the gear 22 but the link 25 pivots at one end 5 relative to bracket 224 and at the other end 6 relative to the gear 22.

Figure 11:
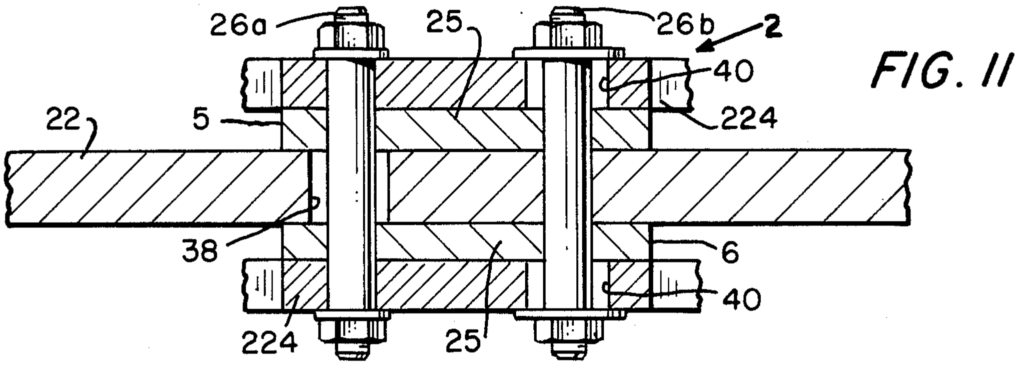
FIG. 11 is a sectional view of the embodiment of FIG. 10 taken on the line 11—11 of FIG. 10.
Figure 10:
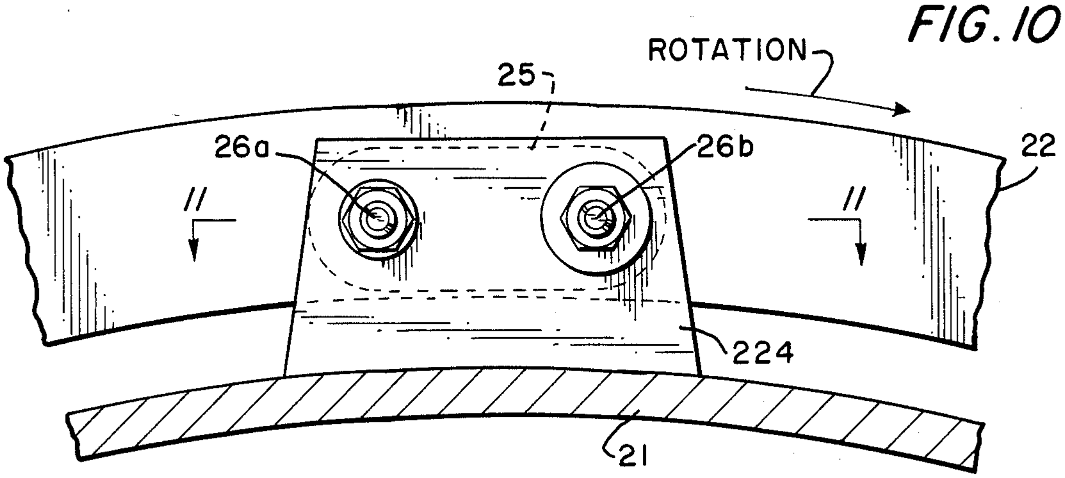
FIG. 10 is a still further embodiment of the invention.

In the embodiment shown in FIGS. 10 and 11, there is shown a compound configuration wherein the coupling assembly 2 includes axially spaced bracket 224 and link members 25 between the bracket 224 and the gear 22. At one end 5, the link members 25 are pivotally connected to the bracket number 224 in the manner of FIGS. 3 and 9 and a clearance opening 38 is provided in gear 22 so that the link member 224 and shell 21 can move radially relative to the gear 22 to allow thermal expansion without resulting in undue stress being applied to the vessel. At its other end 6, the bracket 224 is provided with clearance openings 40 so that the link member 25 will pivot about the gear 22 relative to the bracket 224. With this embodiment, the force exerted on the bracket 224 is spread over a larger base region. For this reason, it is regarded to be a preferred embodiment of superior strength to the other embodiments.

Figure 13:
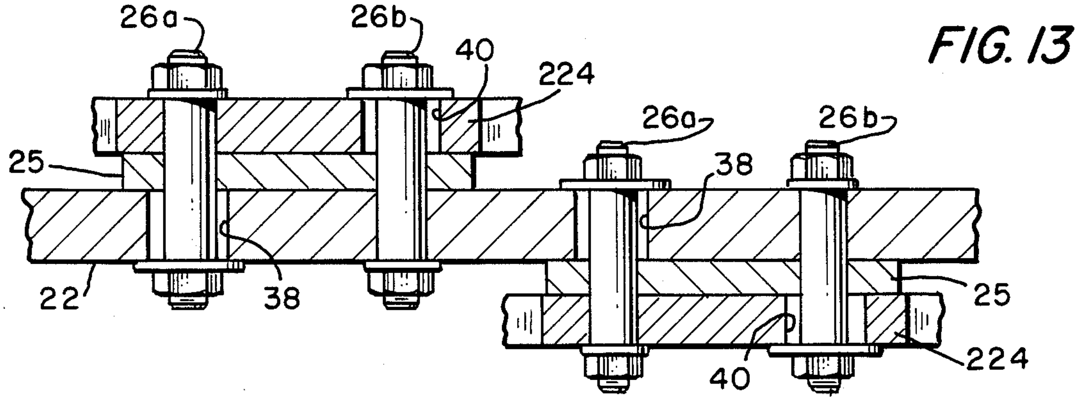
FIG. 13 is a sectional view of the embodiment of FIG. 12 taken on the line 13—13 of FIG. 12.
Figure 12:
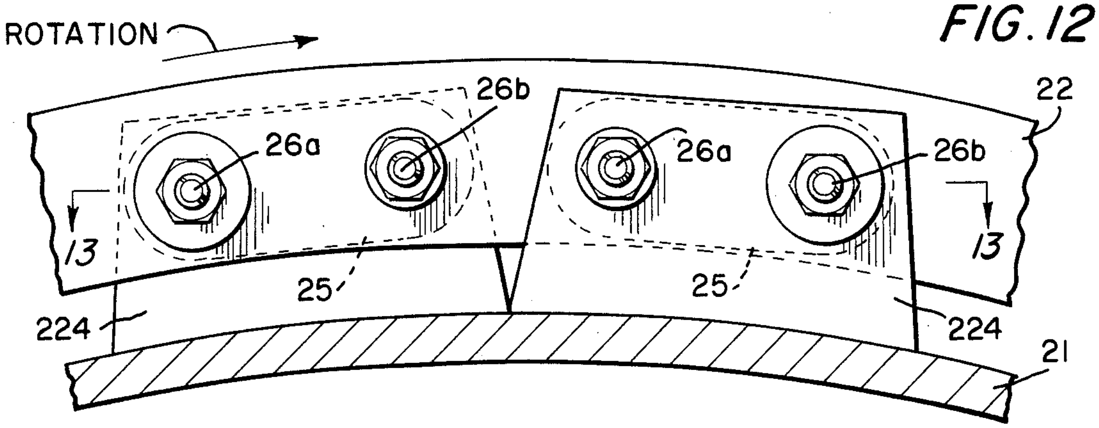
FIG. 12 is another embodiment of the present invention.

FIGS. 12 and 13 are a compound staggered configuration similar to FIGS. 10 and 11 and FIGS. 8 and 9. In this embodiment, the brackets 224 are staggered (compare FIGS. 11 and 13) in the manner of the embodiment of FIGS. 7 to 9, but the brackets 224 and links are similar in configuration to the embodiment of FIGS. 10 and 11. The embodiments of FIGS. 10 to 13 are believed to have greater strength compared to the embodiments of FIGS. 2 to 9.

From the foregoing, it should be apparent that the objects of this invention have been carried out. There has been described five embodiments for coupling a rotary vessel to a girth gear. The invention permits the shell to expand or be slightly misaligned or out of round without exerting undue stress on the shell. Expansion of the shell results in the link members pivoting at one end about the brackets attached to the vessel and to pivot at the other end relative to the gear. The ability to expand relative to the gear ensures that minimum amounts of stress are applied to both the shell and the gear.

Those skilled in the art will recognize other embodiments which will provide for coupling between the rotary vessel and the driving element so that excessive stress on the heated element is avoided.

I claim:

1. A rotary assembly for rotating a shell about its own axis comprising:

a girth gear having an inner and outer circumference, said outer circumference having a plurality of teeth adapted to mesh with a driving gear;

a shell located within said inner circumference, spaced apart therefrom, said shell having an axis of rotation substantially concident with an axis of rotation of said girth gear.

a plurality of bracket members connected to said shell, each of said bracket members having first and second axially spaced apart portions radially extending at least to each side of said girth gear;

a link member operatively connected to each of said bracket members at one end thereof by a first pin, said pin connecting said first and second portions and extending through a clearance hole in said girth gear, said link member extending from said one end in the direction of rotation of said girth gear and connected at a second end thereof to said girth gear by a second pin, said pins being located at substantially the same radius from said center of rotation whereby said shell is coupled to said girth gear rotating therewith, said bracket members and pins permitting relative radial movement between said shell and girth gear.

2. A rotary assembly according to claim 1 wherein said second pin extends through a clearance hole in said bracket member and is pivotally connected to said girth gear.

* * * * *